P. KOTLÁR.
LIFE SAVING APPARATUS.
APPLICATION FILED MAY 15, 1908.
936,546.
Patented Oct. 12, 1909.
3 SHEETS—SHEET 1.
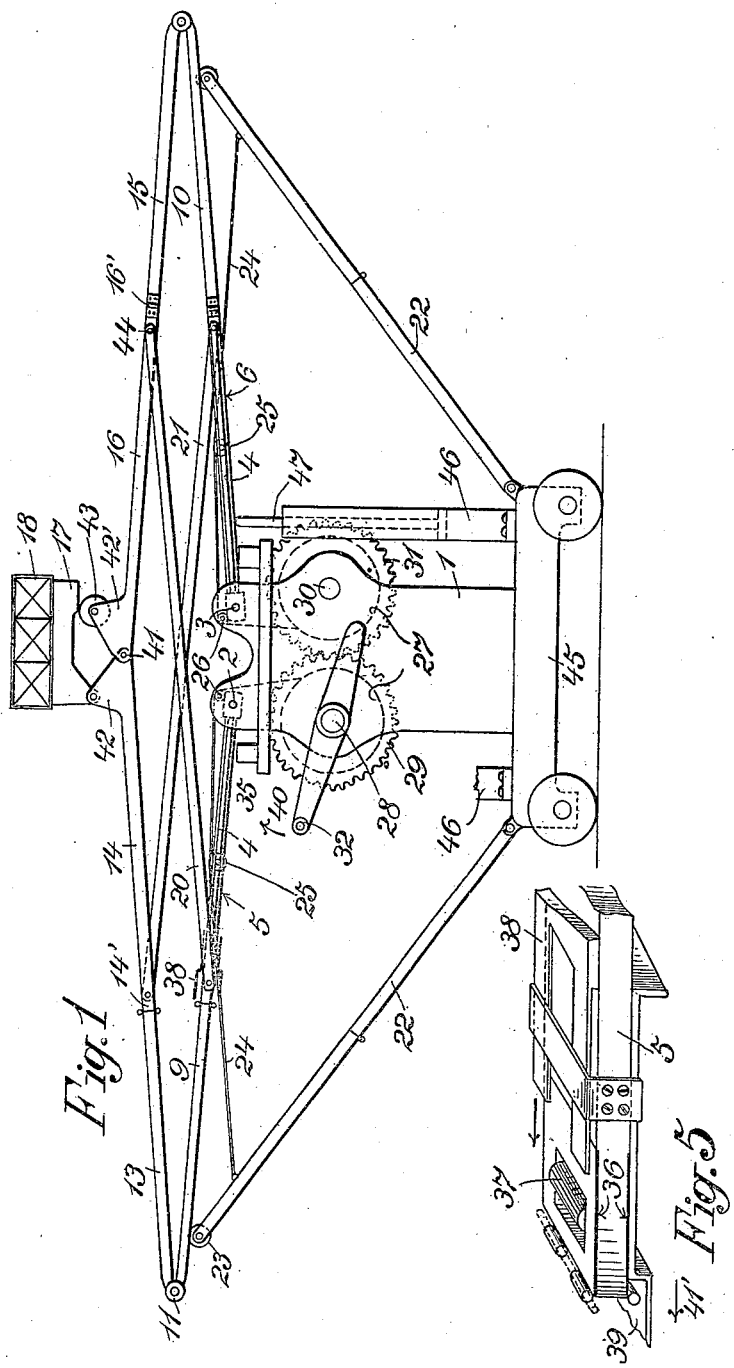
Witnesses:
C. M. Crawford
L. Waldman
Inventor:
Paul Kotlár
by B. Singer
Attorney

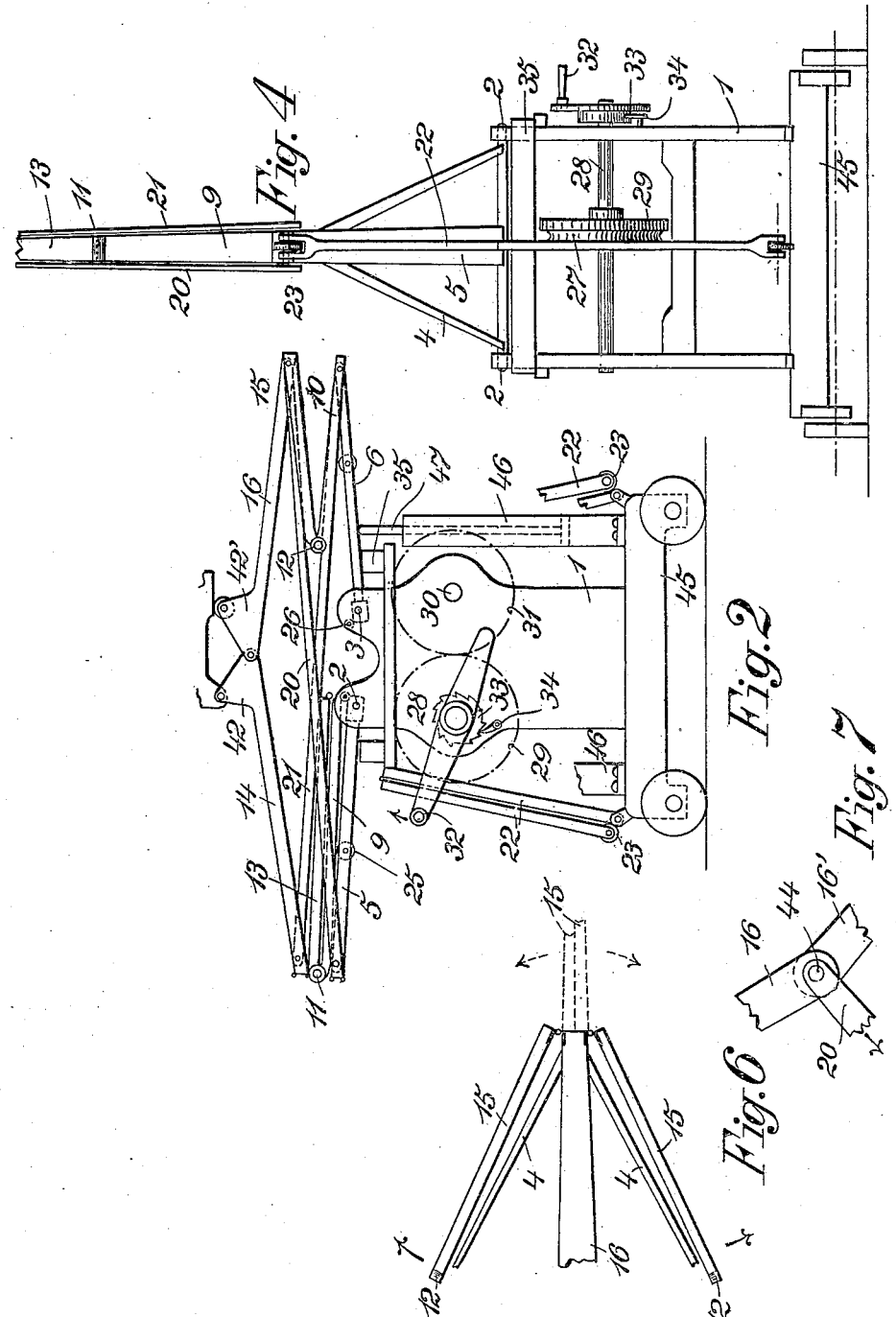

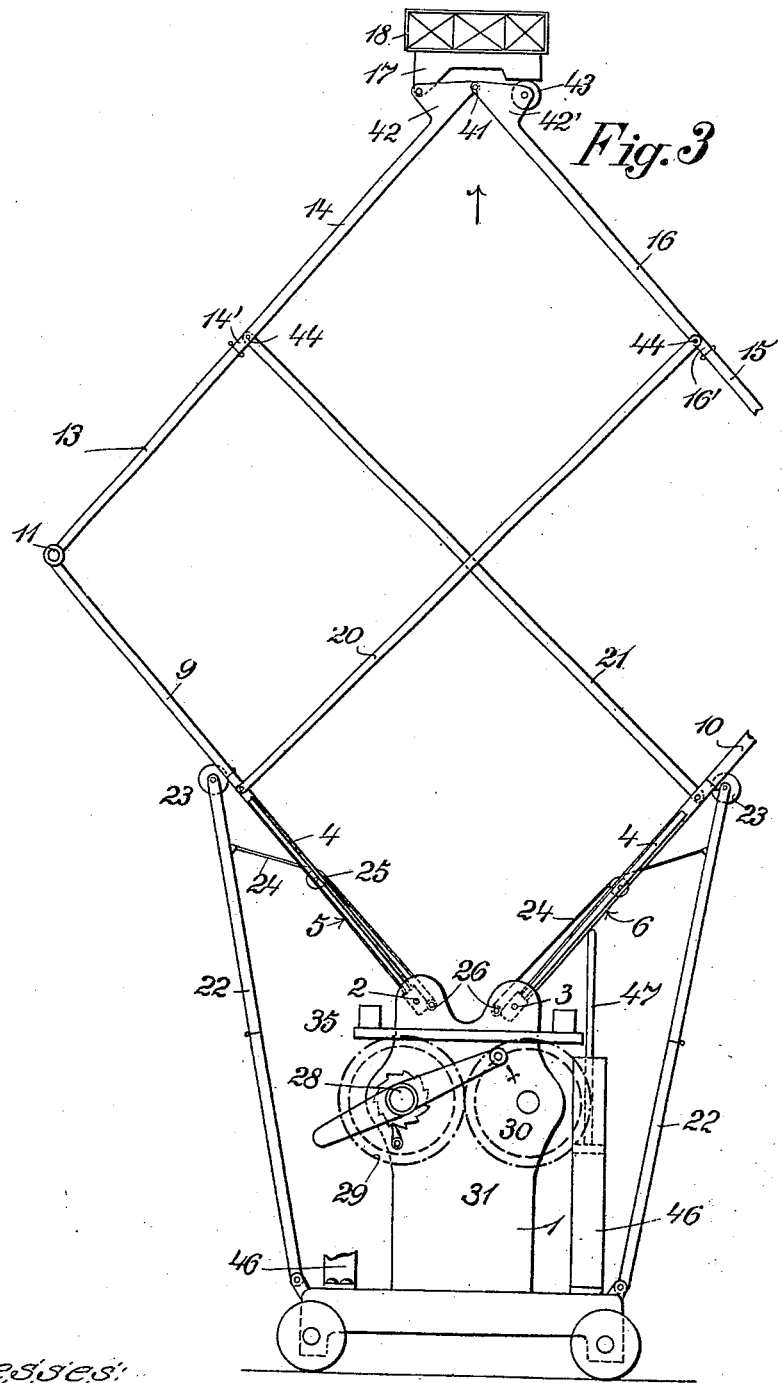

UNITED STATES PATENT OFFICE.

PAUL KOTLÁR, OF BUDAPEST, AUSTRIA-HUNGARY.

LIFE-SAVING APPARATUS.

936,546.  Specification of Letters Patent.  Patented Oct. 12, 1909.

Application filed May 15, 1908. Serial No. 433,064.

*To all whom it may concern:*

Be it known that I, PAUL KOTLÁR, a citizen of the Kingdom of Hungary, and resident of Budapest, Austria - Hungary, have invented new and useful Improvements in and Relating to Life-Saving Apparatus, of which the following is a full, clear, and exact description.

The present invention has for its object a life-saving apparatus especially adapted for use in conflagrations as it permits of the speedy raising of a bridge or the like and the retention thereof in a raised position, so that with this apparatus in conflagrations or in similar cases speedy rescue can be effected from lofty buildings. The apparatus can also be used for military purposes such as for reconnoitering.

In the accompanying drawing which illustrates the invention:—Figure 1 shows the apparatus in elevation. Fig. 2 shows the same with the arms of the frame collapsed. Fig. 3 shows the apparatus in the erected or operative position. Fig. 4 is a partial front elevation of Fig. 3. Fig. 5 illustrates a part of the frame arm in perspective. Fig. 6 is a plan of the frame arm on the right hand side of Fig. 1 in the folded position, and Fig. 7 shows a detail of Fig. 3, to a larger scale.

Referring to the drawings, on the frame 1, which runs on wheels, two arms 5, 6 reinforced by stay rods 4 are rotatably mounted on pivots 2, 3; on the free end of these arms extension pieces 9, 10 are hinged. The joints between the rods 5, 6 and their extensions 9, 10 may be formed in various ways. Thus on the left hand side of Fig. 1 the connection is such that a removable pin is inserted in the eyes of the hinge one half of which is fixed to the rods 5 and 9 respectively.

As shown in the construction illustrated on the right hand side of Fig. 1, the extension of the frame arms consists of two halves hinged to the arm 6 and adapted to be folded into inoperative position (Figs. 2 and 6). On the free ends of the arms 9, 10 double arms 13, 14 and 15, 16 are attached by hinges 11, 12, in a similar manner to the lower arms. These arms 14, 16 are hinged one to the other. Each of the arms 14, 16 is provided at its upper part with a projecting nose 42, 42′, the frame 17 being hinged to the nose 42. Under the influence of gravity the free end of this frame constantly bears upon the roller 43 on the other nose 42. By this means the rotatable bridge or the like 18 is constantly kept in horizontal position. The rods 5, 16 and 6, 14 are joined to each other by means of stay rods 20, 21, so that, in its erected position the apparatus is firmly supported (Fig. 3). In order to enable the stay rods 20, 21 to effect a longitudinal movement as shown in Figs. 3 and 7 the upper members 14, 16 are formed of two parts 14, 14′ hinged together at 44.

Operating rods 22 are pivotally attached at their lower ends to the frame 1; these rods preferably consist of two parts hinged together and adapted to be collapsed in the inoperative position (see Fig. 2). The rods 22 carry at their free ends rollers 23, which bear on the lower side of the arms 5 and 9 and 6 and 10 where they are suitably guided. Wire cables 24 or the like are attached to the upper parts of the rods 22; these cables run on rollers 25 provided on the rod members 5 and 6 and then pass over rollers 26 on the pivots 2 and 3 to drums 27 mounted on the shafts 28, 30. One of these drums may be formed integral with a gear wheel 29 mounted on the same shaft. The gear wheel 29 meshes with a gear wheel 31 mounted on the shaft 30 and adapted to be driven by the crank 32 either directly or by means of suitable gearing. A ratchet wheel 35 (Figs. 2 and 4) is mounted on the crank shaft; a pawl 34 engages in this wheel and prevents its retractive rotation so that the apparatus is maintained in any desired position. Transverse members 35 are fixed to the frame 1, for supporting the frame arms in their approximately horizontal inoperative position (Figs. 1 and 2).

In order that the frame arms may not occupy a considerable space they may be collapsed or folded, as already stated. In the arrangement illustrated in Fig. 5 a roller 37 is mounted on the upper side of the arm 5, the free extremity of which carries hinge members 36; a bolt 38 or the like can be passed in front of this roller. On the lower side a bolt 39 is provided. The object of this arrangement is hereinafter explained.

Upon rotating the crank in the direction indicated by the arrow 40 (Fig. 1) the cables 24 will be wound upon the drums 27 thus erecting the operating rods 22 on their pivots (Figs. 3 and 4). The entire frame is thus caused to assume its erect position (Figs. 3 and 4) and the bridge 18 is also brought into position. By means of the ratchet wheel 33 and pawl 34 the apparatus can be secured in any desired position. A rescued person who has reached the bridge 18 can be lowered by means of a life-saving cage adapted to be lowered or the like. In order to facilitate the erection of the apparatus a container 46 for carbonic acid under pressure or the like with piston rod 47 is provided on each side of the under frame 45; the free ends of these piston rods bear upon the lower rods 4 and 6 respectively. When the apparatus is raised the action of the pressure medium will greatly facilitate this operation (Fig. 3). When the apparatus is lowered its weight will cause the pistons 47 to resume their initial position (Fig. 2).

The apparatus is collapsed in the following manner: When the apparatus has been caused to occupy the position shown in Fig. 1, the arms 9, 13 and 10, 15 can be arranged as shown in Fig. 2 in order that they may not constitute an impediment to the transport of the apparatus. For this purpose (as shown on the left hand side) the bolt 39 is displaced in the direction indicated by the arrow 41' (Fig. 5) the hinge pins are withdrawn from the eyes on the lower arms, then the pins are withdrawn from the hinges on the upper arms and these arms are arranged against the lower arms, whereupon the arms 9, 13, which are now released, are drawn up on the arm 5 and displaced inward on the roller 37 into the position shown in Fig. 2.

In the arrangement illustrated on the right hand side of Fig. 1, the suitably connected halves of the arms 10, 15 are released and then caused to occupy the position shown in Fig. 6 by rotating them about their hinges.

It will of course be understood that the several parts may be modified without affecting the principle of the invention, which consists in the provision of an appropriately stayed frame carrying at its upper part a bridge or the like for the reception of rescued persons, the said frame being adapted to be raised by rods actuated by a cable.

I claim as my invention:

1. A life-saving apparatus comprising in combination, a lazy-tong superstructure comprising a plurality of tongs, members in alinement with the lower tongs and detachably connected therewith, and erecting means adapted to engage said members.

2. A life-saving apparatus comprising in combination, a lazy-tong superstructure comprising a plurality of tongs, members in alinement with the lower tongs and detachably connected therewith, elements pivotally connected to said members and detachably connected with upper tongs of said structure, and erecting means adapted to engage said members.

3. A life-saving apparatus comprising in combination, a lazy-tong superstructure comprising a plurality of tongs, hinge sleeves provided at the outer ends of said tongs, a plurality of members in pivotal connection with each other, hinge sleeves provided at the free end of said members, a plurality of hinge pintles, said hinge sleeves of said tongs being adapted to register with the hinge sleeves of said members, and erecting means adapted to engage said members.

In testimony whereof I affix my signature in the presence of two witnesses.

PAUL KOTLÁR.

Witnesses:
 JOSEPH WILKMANN,
 MICHAEL TÓMÓS.